United States Patent
Scaramozzino et al.

(10) Patent No.: US 8,632,076 B2
(45) Date of Patent: Jan. 21, 2014

(54) ANNULAR SEALING ASSEMBLY, IN PARTICULAR FOR INSERTION BETWEEN ELEMENTS SUBJECTED TO AN OFFSET POSITIONING

(75) Inventors: Francesco Scaramozzino, Villanova d'Asti (IT); Roberto Pasino, Castellero (IT)

(73) Assignee: Aktiebolaget SKF, Göteborg (SE)

(*) Notice: Subject to any disclaimer, the term of this patent is extended or adjusted under 35 U.S.C. 154(b) by 0 days.

(21) Appl. No.: 13/527,138

(22) Filed: Jun. 19, 2012

(65) Prior Publication Data
US 2013/0001889 A1 Jan. 3, 2013

(30) Foreign Application Priority Data
Jul. 1, 2011 (IT) ................ TO2011A0581

(51) Int. Cl.
*F16J 15/32* (2006.01)
(52) U.S. Cl.
USPC .............. 277/558; 277/560; 277/549
(58) Field of Classification Search
USPC .................. 277/549, 552, 558, 560, 561
See application file for complete search history.

(56) References Cited

U.S. PATENT DOCUMENTS

| 3,664,675 | A | * | 5/1972 | Malmstrom | 277/400 |
| 3,729,204 | A | * | 4/1973 | Augustin | 277/559 |
| 3,785,660 | A | * | 1/1974 | Bush | 277/559 |
| 5,553,870 | A | * | 9/1996 | Czekansky et al. | 277/559 |
| 5,855,375 | A | | 1/1999 | Wilcox et al. | |
| 2009/0028479 | A1 | | 1/2009 | Dittmann | |
| 2012/0063707 | A1 | | 3/2012 | Pasino | |

FOREIGN PATENT DOCUMENTS

| EP | 0965779 A2 | 12/1999 |
| IT | TO2010A000689 A1 | 2/2012 |

* cited by examiner

*Primary Examiner* — Gilbert Lee
(74) *Attorney, Agent, or Firm* — Bryan Peckjian; SKF USA Inc. Patent Department

(57) ABSTRACT

A sealing assembly for insertion between first and second mechanical elements subjected to offset positioning, including a reinforcement ring and at least one elastomeric sealing element in which the reinforcement ring is at least partially embedded, the sealing element including an annular membrane shaped as a truncated-cone sleeve and free from the reinforcement ring, which membrane obliquely extends to protrude from the reinforcement ring, towards a symmetry axis of the sealing assembly and ends with at least one annular sealing lip intended to slidingly cooperate with the first mechanical element; the membrane has, in radial direction, a relatively thin thickness, thinner than that of the at least one sealing lip, so as to be highly flexible, and a plurality of stiffening ribs formed with the membrane, which extend in the axial direction, parallel to one another, spaced apart from one another to form longitudinally extending radial projections on the membrane.

17 Claims, 4 Drawing Sheets

ANNULAR SEALING ASSEMBLY, IN PARTICULAR FOR INSERTION BETWEEN ELEMENTS SUBJECTED TO AN OFFSET POSITIONING

CROSS-REFERENCE TO RELATED APPLICATION

This U.S. Non-Provisional Utility application claims the benefit of copending Italian Provisional Patent Application Serial No. TO2011A000581, filed on 1 Jul. 2011, which is incorporated herein in its entirety.

FIELD OF THE INVENTION

The present invention relates to an annular sealing assembly intended in particular to be interposed between mechanical elements which may be subjected to possible offset positioning in application, such as, for example, the rod and the body of a shock absorber or the suspension forks of cycles or motorcycles.

BACKGROUND OF THE INVENTION

The hydraulic shock absorbers are extensively used in the automotive industry and intended to work under even relatively high hydraulic pressures and in a highly contaminated environment (water, dust, mud). The seal for the pressurized oil contained in the shock absorber must be consequently protected by a sealing assembly known as "dust seal", arranged between the rod and the mouth of the shock absorber body, in order to preserve its function over time.

This sealing assembly is subject in application, as a consequence of its position, to maximum radial deformations, in particular when a temporary offset positioning occurs between the shock absorber rod or the suspension fork and the body of the shock absorber or of the suspension, e.g. caused by a high excursion of the rod or fork accompanied by the application of side loads, which determine an oblique positioning of the rod or fork with respect to the symmetry axis of the sealing lip which acts thereon, usually loaded by a radial spring.

A similar problem may occur also in other situations, e.g. in static seals arranged between motor head and injectors, in the case in which seal seat and injector seat are not perfectly aligned.

Italian patent application TO20100689 solves the problem by means of a sealing assembly consisting in an annular sealing element made of elastomeric material provided with a sealing lip and a reinforcement ring at least partially embedded in the sealing element, to which a guide bush made of relatively rigid material, e.g. a polymer, intended to couple in application with the rod of the shock absorber or the suspension fork, is snap-fitted.

Although satisfactory, the sealing assembly described above requires the use of several components and may display insufficient performance in presence of relatively high offset positions. U.S. Pat. No. 5,855,375 does not solve any of these problems.

It is the object of the present invention to provide a sealing assembly which is free from the described drawbacks, and which has small dimensions, low cost and short production times and which at the same time has good sealing performance with regards to external contaminants also in presence of high offset positions of the mechanical elements between which it is inserted in application, which could damage the contact between sealing lip and member with which it cooperates, despite the presence of a radial compression spring of the sealing lip.

SUMMARY OF THE INVENTION

According to the invention, a sealing assembly is provided. A first aspect of the invention provides a sealing assembly (1;1a;1b), in particular for insertion between first (2) and second (3) mechanical elements subjected to possible offset positioning, comprising:

a reinforcement ring (8) and at least one elastomeric sealing element (9) in which the reinforcement ring (8) is at least partially embedded, the sealing element (9) having an annular membrane (10) shaped as a truncated-cone sleeve and free from the reinforcement ring, which membrane obliquely extends in the radial section so as to protrude from the reinforcement ring (8), towards a symmetry axis (A) of the sealing assembly and ends with at least one annular sealing lip (12) intended to slidingly cooperate with a first mechanical element (2); and wherein the membrane (10) is delimited by a lateral wall (18) which has, in the radial direction, a relatively thin thickness, thinner than that of the at least one sealing lip (12), so as to be highly flexible, the membrane (10) further has a plurality of stiffening ribs (19) obtained in one piece with the lateral wall (18) of the membrane, as localized thickenings of the membrane (10), and extending in the axial direction parallel to one another, spaced apart from one another to form on the membrane (10) a crown of longitudinally extending radial projections.

BRIEF DESCRIPTION OF THE DRAWINGS

Further features and advantages of the present invention will be apparent from the following description of non-limitative embodiments thereof, made with reference to the accompanying drawings, in which FIG. 1 diagrammatically shows a cutaway axonometric view of a suspension for a motorcycle provided with a "dust seal" sealing assembly made according to the invention.

DETAILED DESCRIPTION OF THE INVENTION

With reference to figures from 1 to 3, numeral 1 (FIG. 3) indicates as a whole a sealing assembly particularly adapted to be interposed between a first mechanical element 2 and a second mechanical element 3 subject to possible offset positioning in application.

Figure 1:
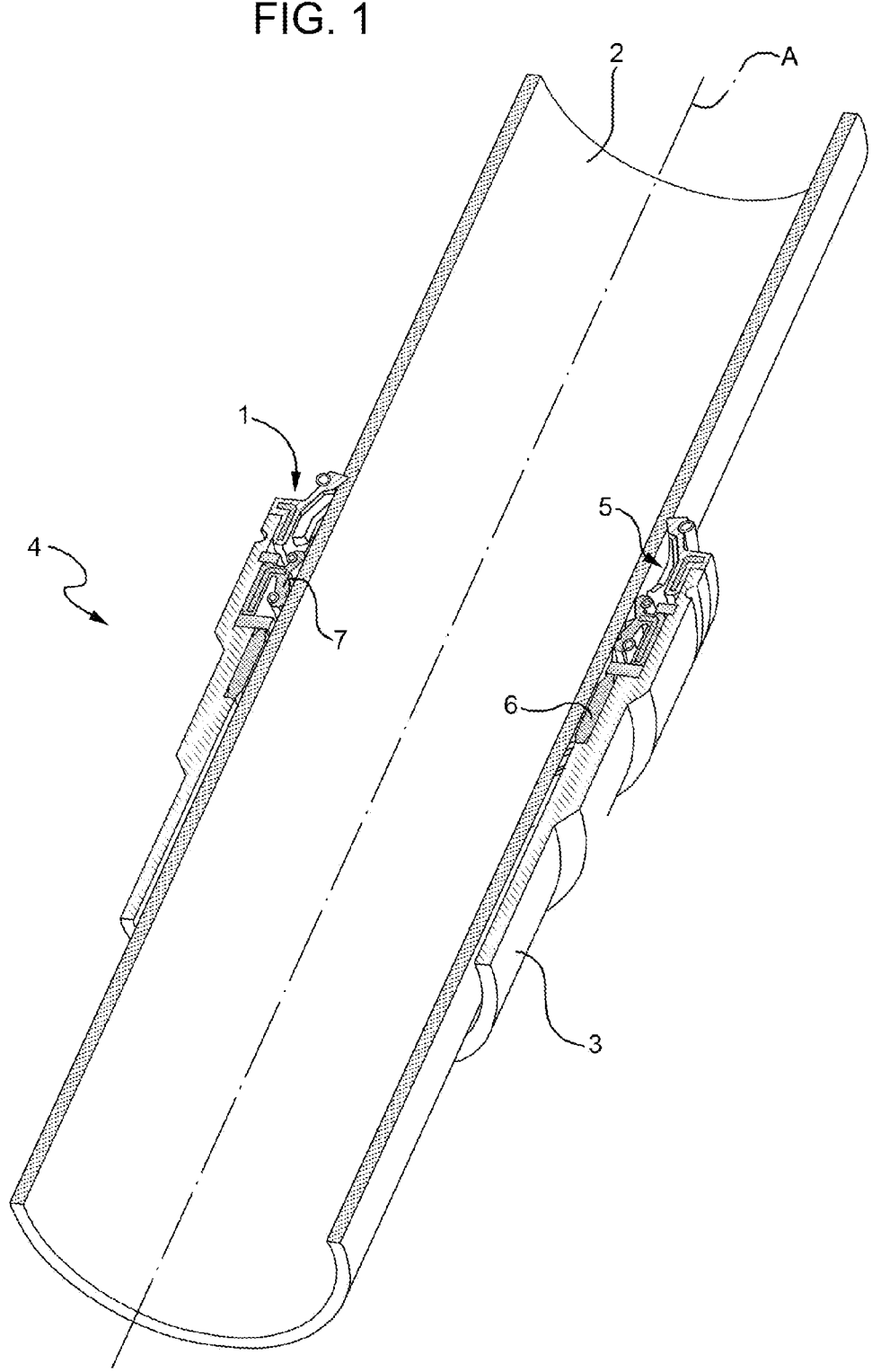

With reference to the non-limiting embodiment shown in FIG. 1, these elements 2 and 3 consist of a fork rod 2 and a tubular body 3 of a suspension 4 of a motor cycle comprising, in addition to the fork rod 2 and the body 3, the sealing assembly 1 according to the invention, which is fitted on a mouth 5 of the body 3, through which the fork rod 2 is accommodated in the body 3 in telescopic manner, a guide bushing 6 for the fork rod and an oil sealing assembly 7, of the double lip type, generally known, arranged near bushing 6 to prevent the oil present between body 3 and the fork rod 2 from exiting from mouth 5; the sealing assembly 1 performs a so-called "dust seal" function, e.g. protects the sealing assembly 7 from contaminants (water, dust, mud) present outside body 3.

Figure 2:
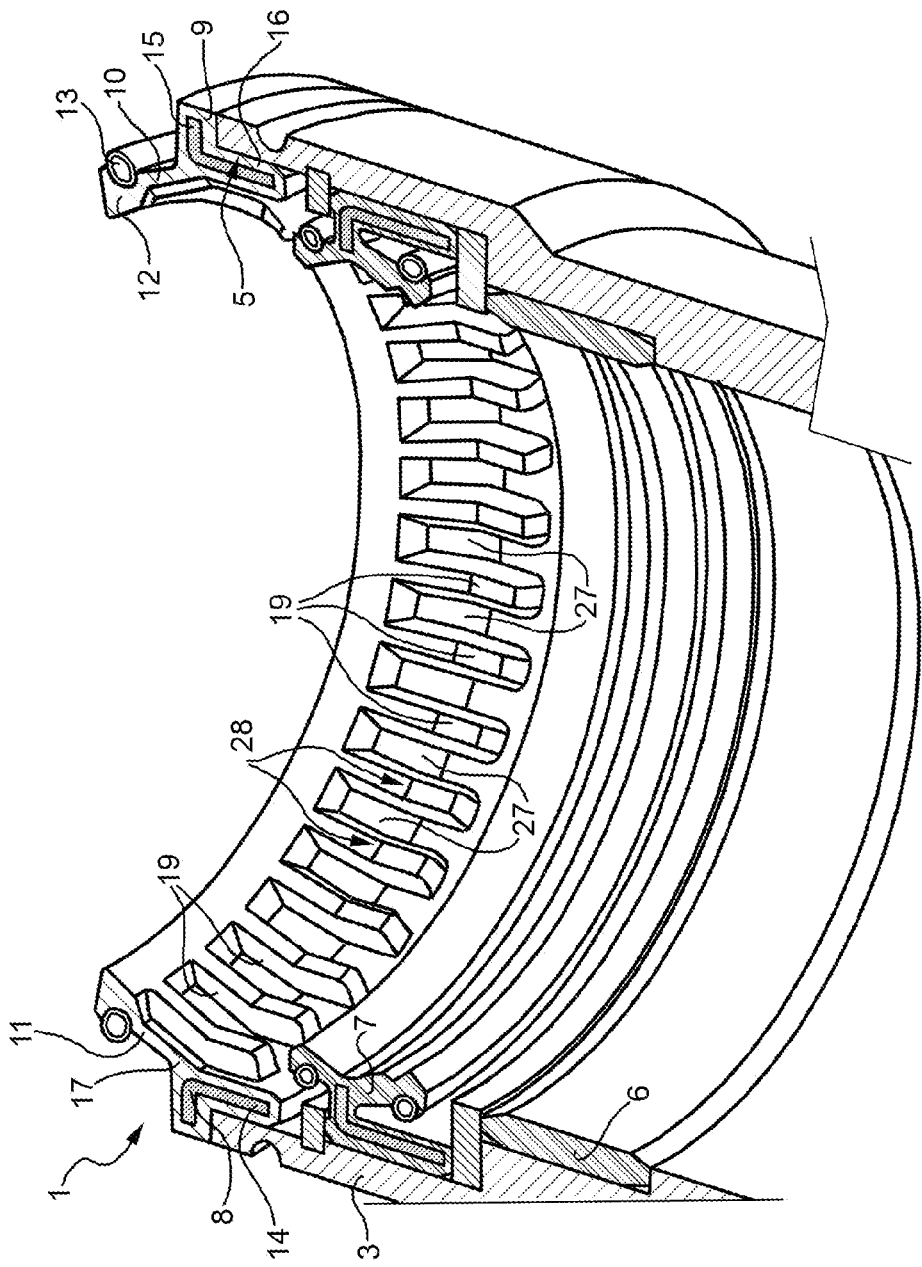
FIG. 2 shows an enlarged view of a cutaway axonometric view of a detail of the suspension in FIG. 1, with parts removed for the sake of simplicity.
Figure 3:
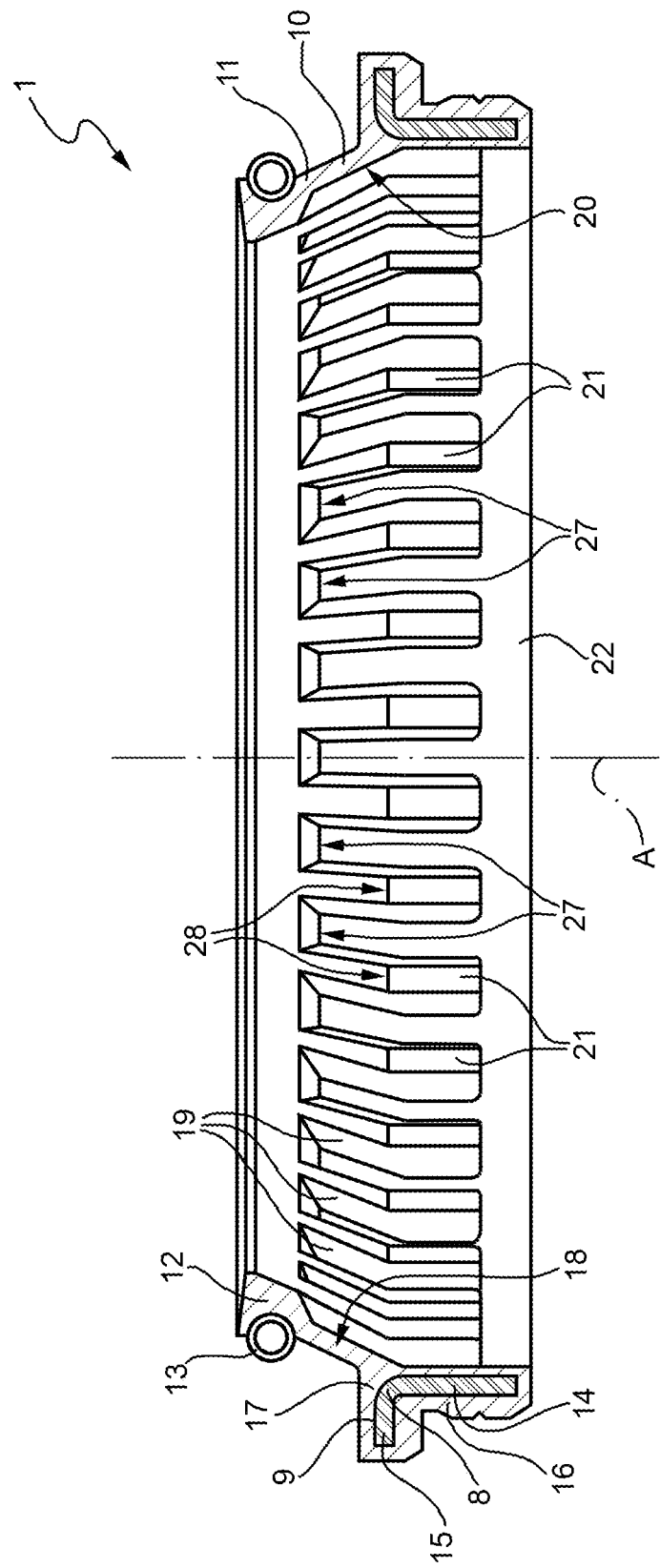
FIG. 3 shows an elevation orthogonal view of the sealing assembly according to the invention applied to the suspension in FIGS. 1 and 2.

With reference to FIGS. 2 and 3, the sealing assembly 1 according to the non-limiting example shown comprises a reinforcement ring 8 made of coined metal sheet, used as supporting and stiffening element, and at least one elastomeric sealing element 9, in which the reinforcement ring 8 is at least partially embedded (totally embedded, in the illustrated example).

The sealing element 9 comprises, an annular membrane 10 shaped as a truncated-cone sleeve and free from the reinforcement ring 8 in all its parts, which membrane obliquely extends in radial section so as to protrude from the reinforcement ring 8, towards a symmetry axis A of the sealing assembly 1, coinciding in application with the axis of the suspension 4 (FIG. 1) and which ends at a free end 11 thereof, opposite to the reinforcement ring 8, with at least one annular sealing lip 12 intended to slidingly cooperate, in application, with the rod fork 2.

The dust lip 12 is shaped as a dust boot lip and is radially provided on the outside with a radial compression spring 13 (known). The reinforcement ring 8 is L-shaped in radial section and comprises a sleeve portion 14 coaxial with axis A and a flange portion 15 substantially oriented perpendicularly to axis A and which extends perpendicularly, radially on the outside, so as to protrude from a terminal end of the sleeve portion 14.

The elastomeric sealing element 9 comprises a sleeve-shaped base portion 16 within which at least part of the reinforcement ring 8 is embedded, in the case in point, the sleeve portion 12 of the same, and a root portion 17, defined by a first enlarged, flange-shaped end of the base portion 16, within which the flange-shaped portion 15 of the reinforcement ring 9 is embedded and in which the truncated-cone-shaped sleeve radially protrudes from side opposite to the sleeve portion 14 of the reinforcement ring 8.

The membrane 10, along with the lip 12, is formed in one piece with the base portion 16 and with the root portion 17 in which the reinforcement ring 8 is embedded, so that the sealing assembly 1 is integrally made in one piece.

According to the invention, the membrane 10 is delimited by a side wall 18 which has in radial direction a relatively thin thickness, thinner than that of the at least one sealing lip 12 and of the root portion 17, so as to be highly flexible; the membrane 10 further has a plurality of stiffening ribs 19 obtained in one piece with the side wall 18, as localized thickenings of the membrane 10, and which extend in axial direction parallel to each other and equally distanced to form a crown of longitudinal radial protrusions on the membrane 10.

The stiffening ribs 19 of the membrane 10 are integrally formed in one piece with the side wall 18, in order to radially extend so as to protrude from a radially inner lateral truncated-cone surface 20 of the side wall 18 facing the symmetry axis A. In particular, the ribs 19 extend in axial direction for the entire axial extension of membrane 10, on the side opposite to the sealing lip 12 and without affecting the function of lip 12, with which they are seamlessly joined, in this case flushed.

According to the non-limiting example shown in FIG. 3, the base portion 16 of the sealing element 9 is also provided at least along part of its axial extension and starting from the first end defining the root portion 17, with second rectilinear stiffening ribs 21, which extend in axial direction, parallel to one another and spaced apart from one another, to form a crown of longitudinally extending, radial projections on the base portion 16, radially on the interior thereof; the ribs 21 are seamlessly made as extensions on the base portion 16 of the corresponding ribs 19 of the membrane 10: each rib 21 therefore forms a single, continuous item with a respective rib 19, of which it constitutes an extension on portion 16.

In the embodiment shown in FIG. 3, in which the sleeve-shaped base portion 16 has the continuation ribs 21 of the ribs 19, the base portion 16 has a cylindrical shape and a terminal segment 22 thereof, opposite to the membrane 10, is free from ribs 21. The flange-shaped root portion 17 further extends radially outwards on the side opposite to the ribs 19,21 so that the base portion 16 is used to fit the sealing assembly 1 on the body 3, driven into the mouth 15.

Figure 4:
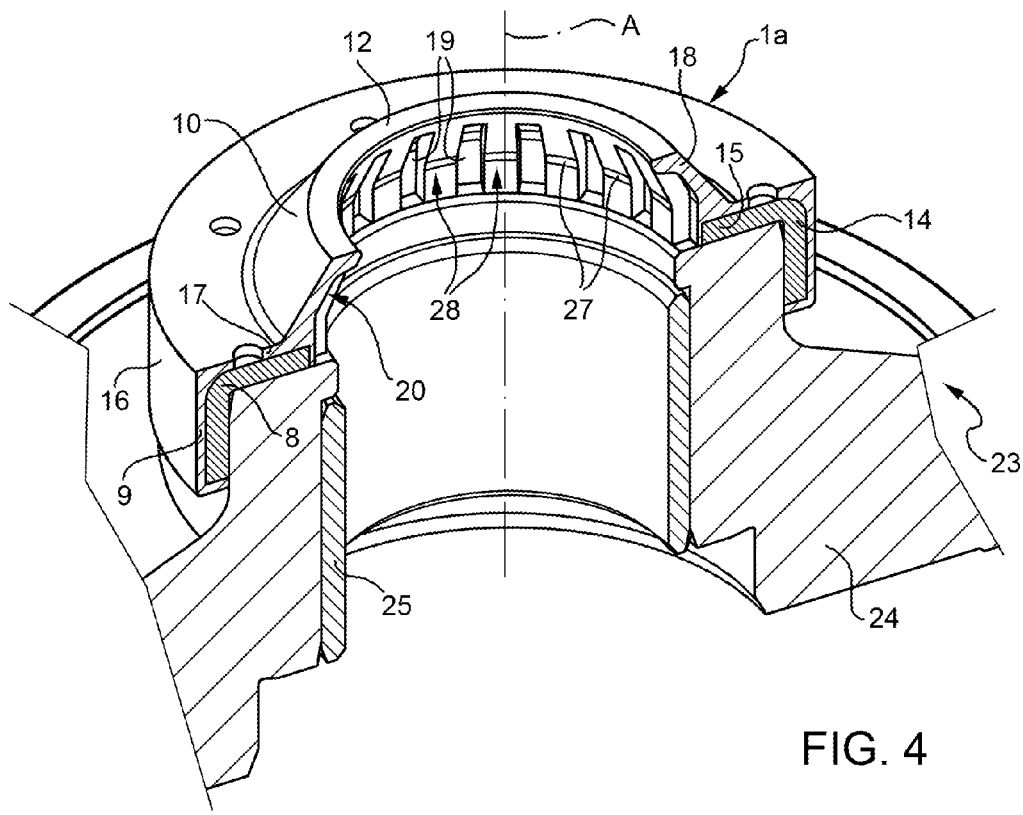
FIG. 4 diagrammatically shows a cutaway axonometric view of a guiding and sealing unit for a shock absorber rod including the sealing assembly made according to the invention.
Figure 5:
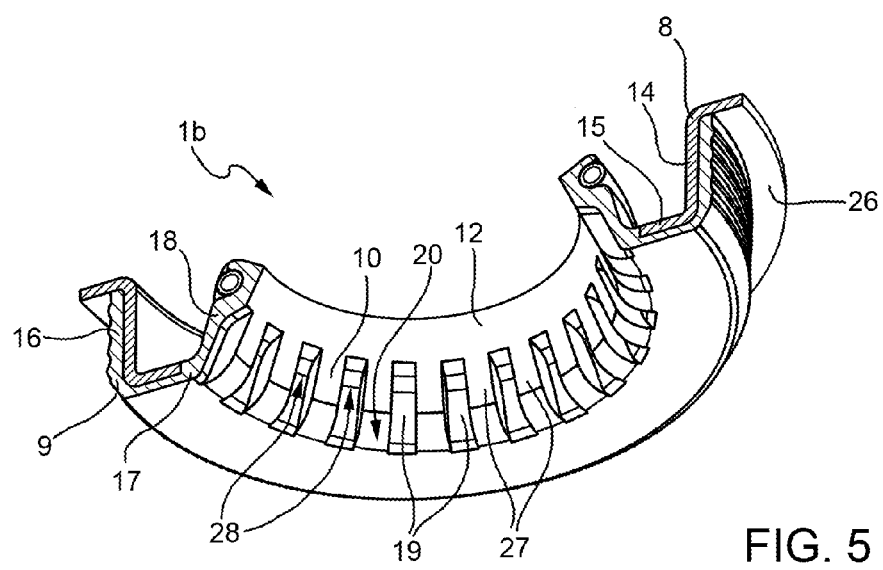
FIG. 5 shows a cutaway axonometric view of a sealing assembly according to the invention in a variant particularly adapted to obtain either a static sealing action between an injector and a respective engine head or a dynamic sealing action on a rotating shaft, both not shown for the sake of simplicity.

FIGS. 4 and 5, in which details similar or equal to those already described are indicated for the sake of simplicity with the same reference numerals, illustrate respective possible variants 1a and 1b of the sealing assembly 1.

FIG. 4, in particular, shows a guiding and sealing unit 23 for a monotube shock absorber rod (not shown for the sake of simplicity) comprising a sealing assembly 1a according to the invention, and an annular rod guide bush 24, provided with a low-friction coefficient bush 25, which is fixed to the internal side wall of the shock absorber body in application and which is symmetric to axis A and is engaged through by the rod in application. The sealing assembly 1a has a reinforcement ring 8 L-shaped in radial section, the flange portion 15 of which in this case radially extends inwards starting from the sleeve portion 14, instead of radially outwards, as in the case of the sealing assembly 1 in FIG. 3. Consequently, the base portion 16 of the elastomeric sealing element 9 is cup-shaped (i.e. has an annular bottom wall from which a side wall protrudes) and has the root portion 17 which radially protrudes towards axis A (inwards), from which in turn the truncated-cone shaped membrane 10 protrudes radially inwards, which membrane thus defines a sort of perforated dome of the sealing element 9. In this case, only ribs 19, radially obtained on the inside, protruding from the side surface 20 of the side wall 18, are present.

FIG. 5 instead illustrates a sealing assembly 1b particularly adapted to provide a static oil seal action between an a injector and its seat on the engine head, known and not shown for the sake of simplicity. The sealing assembly 1b is shaped as an annular channel element because the L-shaped reinforcement ring 8 has a truncated-cone-shaped sleeve portion 14 embedded within a corresponding sleeve portion 16 of the elastomeric sealing element 9, a flange portion 15, which extends radially inwards, embedded within the root portion 17 of the reinforcement ring 8, and membrane 10 with the radially internal ribs 19 which protrude from the root portion 17, but in this case on the same side as the sleeve portion 14, instead of on the opposite side of the same, as in embodiments 1 and 1a. Furthermore, the sleeve portion 14 of the reinforcement ring 8 has an L-shaped folded edge 26 opposite to the flange portion 15 and not embedded in the sealing element 9, which is used to assemble the sealing assembly 1b in the engine head seat.

In all embodiments 1, 1a and 1b of the sealing assembly according to the invention, the height of the stiffening ribs 19 of the membrane 10, measured in radial direction, is substantially equal to the thickness, measured in radial direction, of the side wall 18 of the membrane 10, so that such a side wall of the membrane 10 has, at the ribs 19, a radial thickness which is substantially double that of the respective longitudinal portions 27 of the membrane 10 free from ribs 19.

Furthermore, the width of the ribs 19 of membrane 10, measured in circumferential direction, is substantially equal to the radial height of ribs 10, measured starting from the side wall 18 of membrane 10 and to the respective terminal crests 28 of ribs 19.

Finally, the circumferential spacing between ribs 19 of membrane 10, i.e. the circumferential width of the respective longitudinal portions 27 of the membrane 10 free from ribs 19, is substantially equal to or higher than the radial height of the ribs 19 measured as above.

By means of the described structure, the sealing lip 12 is supported in relatively rigid manner in axial direction by the elastomeric sealing element 9, and is extremely flexible in both radial and circumferential direction, i.e. in the directions transversal to the longitudinal development of ribs 19. It may thus follow the movement of the rod or other element 2 with which it works in contact, independently of the relative position of the base portion 16, in application. In the case of sealing assemblies 1 and 1a, the fork rod or the shock absorber rod may thus assume any oblique position with respect to axis A without the continuous circumferential contact with lip 12 coming less, by virtue of the elastic deformations that the membrane 10 undergoes in the circumferential and radial directions, maintaining the sealing of lip 12, in the case in point on the fork rod 2. The high axial rigidity, in all cases, allows to maintain this stiffness as a consequence of radial, wide movements of the fork rod 2.

In the case of the sealing assembly 1b, the described structure allows to mount the injector in its seat with a wide assembly tolerance, because possible offset positions are absorbed by the elastic deformation of membrane 10 while maintaining the lip 12 statically engaged on the injector, thus providing an optimal sealing action. This allows to reduce the engine head production costs and reduce injector assembly costs and times. The same advantage is obtained if the sealing assembly 1b is used to be interposed between a rotating shaft and its seat, e.g. in the engine crankcase.

The invention discloses the use of a sealing assembly integrally made in one piece, which does not consequently have separate/separable components, and wherein the sealing lip is supported with a relatively high axial stiffness, which consequently ensures good sealing performance, also in presence of high, rapid axial excursions of the mechanical components between which it is inserted. In all cases, a high flexibility of the sealing lip is further guaranteed both in radial direction and in circumferential direction, which allows the sealing lip to "follow" the side movements of the shock absorber rod or of the suspension fork without ever loosing contact along the entire circumferential extension of the rod or fork.

What we claim is:

1. A sealing assembly for insertion between first and second mechanical elements subjected to possible offset positioning, comprising:
   a reinforcement ring, and
   at least one elastomeric sealing element in which the reinforcement ring is at least partially embedded, and wherein
   the sealing element having an annular membrane shaped as a truncated-cone sleeve and free from the reinforcement ring, which membrane obliquely extends in the radial section so as to protrude from the reinforcement ring, towards a symmetry axis of the sealing assembly and ends with at least one annular sealing lip intended to slidingly cooperate with a first mechanical element; and wherein
   the membrane is delimited by a lateral wall which has, in the radial direction, a relatively thin thickness, thinner than that of the at least one sealing lip, so as to be highly flexible, and wherein
   the membrane further has a plurality of stiffening ribs obtained in one piece with the lateral wall of the membrane, as localized thickenings of the membrane, and extending in the axial direction parallel to one another, spaced apart from one another to form on the membrane a crown of longitudinally extending radial projections.

2. The sealing assembly according to claim 1, wherein the stiffening ribs of the membrane are formed from a single piece with the lateral wall of the membrane, and radially extend so as to protrude from a radially inner, lateral truncated-cone surface of the lateral wall of the membrane, facing the symmetry axis.

3. The sealing assembly according to claim 1, wherein the ribs extend in the axial direction from the side opposite to the sealing lip and without affecting the function of the at least one annular sealing lip, over the whole axial extension of the membrane.

4. The sealing assembly according to claim 1, wherein the height of the stiffening ribs of the membrane, measured in the radial direction, is substantially equal to the thickness of the lateral wall of the membrane, measured in the radial direction, so that the lateral wall of the membrane has, at the ribs, a substantially double radial thickness as compared to respective longitudinal portions of the membrane without ribs.

5. The sealing assembly according to claim 1, wherein the width of the ribs of the membrane, measured in the circumferential direction, is substantially equal to the radial height of the ribs, measured from the lateral wall of the membrane and to a terminal ridge of the ribs.

6. The sealing assembly according to claim 1, wherein the circumferential width of respective longitudinal portions of the membrane without ribs, is substantially equal to or greater than the radial height of the ribs, measured from the lateral wall of the membrane and to a terminal ridge of the ribs.

7. The sealing assembly according to claim 1, wherein the at least one sealing lip is a dust-preventing lip radially, externally provided with a radial compression spring.

8. A sealing assembly for insertion between first and second mechanical elements subjected to possible offset positioning, comprising:
   a reinforcement ring, and
   at least one elastomeric sealing element in which the reinforcement ring is at least partially embedded, and wherein
   the sealing element having an annular membrane shaped as a truncated-cone sleeve and free from the reinforcement ring, which membrane obliquely extends in the radial section so as to protrude from the reinforcement ring, towards a symmetry axis of the sealing assembly and ends with at least one annular sealing lip intended to slidingly cooperate with a first mechanical element; and wherein
   the membrane is delimited by a lateral wall which has, in the radial direction, a relatively thin thickness, thinner than that of the at least one sealing lip, so as to be highly flexible, and wherein the membrane further has a plurality of stiffening ribs obtained in one piece with the lateral wall of the membrane, as localized thickenings of the membrane, and extending in the axial direction parallel to one another, spaced apart from one another to form on the membrane a crown of longitudinally extending radial projections, and wherein the ribs extend in the axial direction from the side opposite to the sealing lip and without affecting the function of the at least one annular sealing lip, over the whole axial extension of the membrane, and wherein the elastomeric sealing element comprises a sleeve-shaped base portion within which at least part of the reinforcement ring is embedded; and wherein the membrane shaped as a truncated-cone sleeve axially extending so as to protrude from a first end of the sleeve-shaped base portion, which base portion is also provided with second rectilinear stiffening ribs, along at least part of the axial extension thereof and starting from the first end, which second ribs extend in the axial direction parallel to one another and spaced apart from one another, to form on the base portion, radially on the interior thereof, a crown of longitudinally extending, radial projections; and wherein the second ribs being seamlessly made as extensions on the base portion of corresponding ribs of the membrane.

9. The sealing assembly according to claim 8, wherein the base portion of the elastomeric element is shaped as a cylindrical or truncated-cone sleeve, and a corresponding sleeve-shaped portion of the reinforcement ring is embedded.

10. The sealing assembly according to claim 8, wherein the reinforcement ring includes a flange portion, arranged substantially perpendicular to the symmetry axis, embedded within the elastomeric sealing element at the first end of the base portion thereof.

11. A sealing assembly for insertion between first and second mechanical elements, comprising:

at least one elastomeric sealing element comprising a cylindrical portion, a truncated-cone sleeve extending from the cylindrical portion in a radial direction toward a symmetry axis of the sealing assembly and an annular sealing lip at an end of the truncated-cone sleeve, the annular sealing lip being configured to slidingly cooperate with a first mechanical element and the truncated-cone sleeve having a thickness in the radial direction that is less than a thickness of the annular sealing lip;

a reinforcing ring having a flange, the ring being embedded in the cylindrical portion of the at least one elastomeric sealing element and not being embedded in the truncated-cone sleeve; and the truncated-cone sleeve having a plurality of stiffening ribs integrally formed therewith and extending in the axial direction and being spaced apart from one another to form on the truncated-cone sleeve a plurality of axially extending radial projections.

12. The sealing assembly according to claim 11, wherein the reinforcing ring having a flange is completely embedded in the at least one elastomeric sleeve.

13. The sealing assembly according to claim 11, wherein the stiffening ribs have a substantially constant radial thickness.

14. The sealing assembly according to claim 11, wherein the stiffening ribs extend from the truncated-cone sleeve onto the cylindrical portion of the at least one elastomeric sealing element.

15. The sealing assembly according to claim 14, wherein the stiffening ribs have a substantially constant radial thickness.

16. The sealing assembly according to claim 14, wherein the stiffening ribs have a first portion on the truncated-cone sleeve having a first substantially constant radial thickness and a second portion on the cylindrical portion having a second substantially constant radial thickness, and wherein the first radial thickness is substantially equal the second radial thickness.

17. The sealing assembly according to claim 11, wherein the stiffening ribs comprise a first radially inwardly facing planar portion on the truncated-cone sleeve and a second radially inwardly facing planar portion on the cylindrical portion and wherein the first planar portion meets the second planar portion at an obtuse angle.

* * * * *